United States Patent
Kobayashi

(10) Patent No.: US 6,714,996 B1
(45) Date of Patent: Mar. 30, 2004

(54) PROGRAMMABLE CONTROLLER SYSTEM AND METHOD FOR RESETTING PROGRAMMABLE CONTROLLER SYSTEM

(75) Inventor: Tamiki Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/031,790

(22) PCT Filed: Aug. 30, 1999

(86) PCT No.: PCT/JP99/04680

§ 371 (c)(1),
(2), (4) Date: Jan. 25, 2002

(87) PCT Pub. No.: WO01/16678

PCT Pub. Date: Mar. 8, 2001

(51) Int. Cl.[7] .................... G05B 11/00; G06F 13/00; G06F 1/26; G06F 9/00; G06F 9/44

(52) U.S. Cl. ................... 710/5; 710/20; 700/1; 700/2; 700/7; 700/11; 700/18; 700/20; 709/201; 711/166; 712/220; 712/225; 713/300; 713/324; 714/23

(58) Field of Search ............... 700/1, 2, 7, 11, 700/18, 20; 710/5, 12, 20, 58, 107; 702/117; 709/100, 201, 213, 312; 711/100, 166; 712/220, 225; 713/100, 300, 324; 714/23, 30

(56) References Cited

U.S. PATENT DOCUMENTS

| | | | | |
|---|---|---|---|---|
| 4,725,976 A | * | 2/1988 | Nishikido | 714/30 |
| 4,742,443 A | * | 5/1988 | Rohn et al. | 700/7 |
| 4,872,136 A | * | 10/1989 | Cieri et al. | 710/58 |
| 4,888,726 A | * | 12/1989 | Struger et al. | 709/201 |
| 4,937,777 A | * | 6/1990 | Flood et al. | 710/107 |
| 5,319,783 A | * | 6/1994 | Zink et al. | 700/18 |
| 5,392,437 A | * | 2/1995 | Matter et al. | 713/324 |
| 5,809,312 A | * | 9/1998 | Ansel et al. | 713/300 |
| 5,963,444 A | * | 10/1999 | Shidara et al. | 700/7 |
| 6,067,627 A | * | 5/2000 | Reents | 713/324 |
| 6,182,163 B1 | * | 1/2001 | Yamashita et al. | 710/12 |

FOREIGN PATENT DOCUMENTS

| | | | |
|---|---|---|---|
| DE | 195 25 013 C2 | 1/1996 | |
| EP | 566996 A2 | * 10/1993 | ........... G05B/19/05 |
| JP | 63-73316 | 4/1988 | |
| JP | 5-53602 | 3/1993 | |
| JP | Hei. 5-53692 | 3/1993 | |
| JP | 5-290008 | 11/1993 | |
| JP | 7-56763 | 3/1995 | |

* cited by examiner

Primary Examiner—Jeffrey Gaffin
Assistant Examiner—Tanh Nguyen
(74) Attorney, Agent, or Firm—Sughrue Mion, PLLC

(57) ABSTRACT

A CPU unit writes a command for instructing a control CPU specified information for each I/O unit, each I/O unit decodes a command instructed by the CPU unit so as to determine whether or not it is information specified by the control CPU, and holds the corresponding information specified by the control CPU in the I/O unit, the CPU units issue commands for instructing the reset control to all the I/O units, and each I/O unit decodes the command instructing its reset control, and when it has determined that the corresponding command is instructed from the CPU unit of the controlling end, it follows the reset controlling instruction so that the resetting operation of the specific I/O unit on the system specified by the CPU unit is controlled.

9 Claims, 7 Drawing Sheets

PROGRAMMABLE CONTROLLER SYSTEM AND METHOD FOR RESETTING PROGRAMMABLE CONTROLLER SYSTEM

TECHNICAL FIELD

The present invention relates to a programmable controller system and a reset controlling method for the programmable controller system.

BACKGROUND ART

A conventional programmable controller system will be explained with reference to FIG. 7. This programmable controller system is provided with a power-supply unit 500 for supplying power to the system, a CPU unit 510 which forms a center of the system for executing the operation processing for the control, an output unit 520 for outputting ON/OFF information to an external apparatus 600 based upon an instruction outputted by a CPU unit 510, a data link unit 530 for executing data communication between systems (affiliated stations 610) through dedicated lines and a positioning unit 540 connected to a servo-motor 620 for carrying out a positioning control. These units are attached to a mother board 550 containing a system bus (hereinafter, referred to as a base unit), that is, bus-connected.

In the explanation that follows, the output unit 520, the data link unit 530, etc., which are controlled by the CPU unit 510, are generally referred to as an I/O unit.

The CPU unit 510 is provided with a reset circuit 512 in addition to the microprocessor (MPU) 511. The reset circuit 512 unifies an error signal for preliminarily informing the power-supply down sent from the power supply system (power-supply reset signal: hereinafter, referred to as ΣREL signal) and an error signal (hereinafter, referred to as CPU-ERRL signal) due to an operation error, etc., generated by the microprocessor 511 so that a reset signal (hereinafter, ΣMRE signal) for controlling the resetting operation with respect to the I/O unit of the programmable controller system is outputted.

When both of the ΣREL signal and the CRUERRL signal are non-active (H-level) in the reset circuit 512, since no currents are allowed to flow through the diodes 513 and 514, the base electric potential of the transistor 515 is set to the High level, thereby allowing a current to flow through the emitter and collector of the transistor 515 so that the ΣMRE signal is set to the L level (non-active).

For example, when the power-supply unit 500, which has detected the power-supply down due to the power supply off, outputs the ΣREL signal in the L-level, a current flows in the forward direction through the diode 513, thereby setting the base electric potential of the transistor 515 to the L-level, stopping the current to flow between the emitter and collector of the transistor 515, and setting the ΣMRE signal to the H-level (active) correspondingly.

Moreover, in the event of an operation error in the MPU 511, the CPU unit 510 outputs the CPUERRL signal in the L-level so as to reset the I/O unit to the initial state. When the CPUERRL signal is set to the L-level, a current is allowed to flow in the forward direction of the diode 514, thereby setting the base electric potential of the transistor 515 to the L-level, with the result that no current is allowed to flow between the emitter and collector of the transistor 515 and the ΣMRE signal is set to the H-level (active).

In such a case when an operation error occurs in the MPU 511 inside the CPU 510, by a resetting control of the MPU 511 for setting the CPUERRL signal to the L-level so as to set the I/O unit in the initial state, or by the power-supply ON/OFF operation and the resulting reset control in which the power-supply unit 500 has set the ΣREL to the L-level thereby setting the I/O unit in the initial state, the ΣMRE signal is transmitted to all the units (the output unit 520, data link unit 530, and positioning unit 540) through the base unit 550.

Upon receipt of the ΣMRE signal of the H-level, the output unit 520 clears the latch of the output section 521, thereby turning the external apparatus 600 off. The data link unit 530 inputs signals of H-level to the RESET terminals of the control section 531 and the transfer I/F section 532 so that the control section 531 and the transfer I/F section 532 are reset to the initial state, thereby disconnecting the network.

The positioning unit 540 resets the control section 541 to the initial state by inputting signals of H-level to the RESET terminal of the control section 541 and the CLR terminal of the output section 542, and also clears the latch of the output section 542 so as to stop the driving operation of the servo motor 620.

In the conventional programmable controller system as described above, since the resetting system is limited to one system, the resetting control is available only as to whether or not the entire system is reset, and it is not possible to individually reset each unit.

Moreover, in the conventional programmable controller system, when an attempt is made to reset each unit individually, the same circuits as the reset circuit 512 the number of which is as many as the number of the respective units need to be installed in the CPU unit 510 and reset signals corresponding to ΣMRE the number of which is the same as the number of the units need to be provided in the inside of the CPU unit 510 and the base unit 550; however, in the programmable controller system in which the number of units to be connected are freely determined by the user, from a realistic point of view, it is impossible to install those many circuits and control signals.

Moreover, with respect to the conventional programmable controller system, when the control section 541 of the positioning unit 540 is driven out of control, the CPU unit 510 issues a reset signal by outputting the CPUERRL signal in the L-level in order to initialize the control section 541 of the positioning unit 540, and this case causes a problem in which the data link unit 530 is further reset to cut off the net work, etc., and the resulting problem is that the system management becomes ineffective.

Moreover, in the conventional programmable controller system, when the system is stopped due to an operation error, etc., inside the CPU unit 510, a resetting signal is issued so as to clear the output, and this case causes a problem in which the data link unit 530 is further reset to cut off the net work, etc., and the resulting problem is that the system management becomes ineffective.

Furthermore, in the conventional programmable controller system, since each unit is not reset individually, the resulting problem is that it is not possible to control the system by altering the number of units of the CPU units 510 to a single or a plural number by using a programmable controller system using the same base unit 550.

Therefore, in a programmable controller system using the same base unit, the objective of the present invention is to provide a programmable controller system which makes it possible to reset-control individual I/O units by using a single CPU unit or a plurality of CPU units.

DISCLOSURE OF THE INVENTION

The present invention relates to a reset controlling method of a programmable controller system which is provided with a single or a plurality of CPU units for carrying out the control of the entire system and a plurality of I/O units that are operated under a control of the CPU units, and in such are set controlling method, the CPU unit writes a command for instructing a control CPU specified information for each I/O unit, each I/O unit decodes a command instructed by the CPU unit so as to determine whether or not it is information specified by the control CPU, and holds the corresponding information specified by the control CPU in the I/O unit, the CPU units issue commands for instructing the reset control to all the I/O units, and each I/O unit decodes the command instructing its reset control, and when it has determined that the corresponding command is instructed from the CPU unit of the controlling end, it follows the reset controlling instruction so that the resetting operation of the specific I/O unit on the system specified by the CPU unit is controlled. Therefore, only the specific I/O unit on the system that is specified by the CPU unit can be reset.

Moreover, in the present invention, with respect to instructions for issuing a reset to each of the I/O units, the CPU unit is provided with two kinds of instructions for reset-controlling the control section of the I/O unit and for reset-controlling the output section of the I/O unit. Therefore, it is possible to individually reset the control section and the output section of the I/O unit.

The present invention also relates to a reset controlling method of a programmable controller system which is provided with a single or a plurality of CPU units for carrying out the control of the entire system and a plurality of I/O units that are operated under a control of the CPU units, and in such a reset controlling method, the CPU unit is provided with two systems of a signal for reset-controlling the control section of the I/O unit and a signal for reset-controlling the output section of the I/O unit as reset signals that are issued to the entire system by the CPU unit, and by utilizing the two signals independently, the resetting of the I/O unit is carried out individually between the control section and the output section. Therefore, the resetting control of the I/O units on the entire system is carried out in a divided manner between the resetting of the control section of the I/O units and the resetting of the output section thereof.

Moreover, the present invention relates to a programmable controller system which is provided with a single or a plurality of CPU units for carrying out the control of the entire system and a plurality of I/O units that are operated under a control of the CPU units, and in such a programmable controller system, the CPU unit writes a command for instructing a control CPU specified information for each I/O unit, each I/O unit decodes a command instructed by the CPU unit so as to determine whether or not it is information specified by the control CPU, and holds the corresponding information specified by the control CPU in the I/O unit, the CPU units issue commands for instructing the reset control to all the I/O units, and each I/O unit decodes the command instructing its reset control, and when it has determined that the corresponding command is instructed from the CPU unit of-the controlling end, it follows the reset controlling instruction so that the resetting operation of the specific I/O unit on the system specified by the CPU unit is controlled. Therefore, only the specific I/O unit on the system that is specified by the CPU unit can be reset.

Moreover, with respect to instructions for issuing a reset to each of the I/O units, the CPU unit is provided with two kinds of instructions for reset-controlling the control section of the I/O unit and for reset-controlling the output section of the I/O unit. Therefore, it is possible to individually reset the control section and the output section of the I/O unit.

Moreover, in the present invention, the I/O unit is provided with a register for latching control CPU specified information and a register for latching information used for resetting only the specific I/O unit on the system specified by the CPU unit. Therefore, it is possible to reset only the specific I/O unit on the system specified by the CPU unit by reference to the contents of the registers.

Moreover, the present invention provides a programmable controller system of a dispersion control type multi-CPU system in which a plurality of CPU units control respectively different I/O units. Therefore, in the programmable controller system of the dispersion control type multi-CPU system, it is possible to reset only the specific I/O unit on the system specified by the CPU unit.

Furthermore, the present invention provides a programmable controller system of a redundant control type multi-CPU system containing a stand-by CPU unit which, when any one of the duty CPU units that are currently operated is stopped due to an error, is operated in place of the stopped CPU unit. Therefore, in the programmable controller system of the redundant control type multi-CPU system, it is possible to reset only the specific I/O unit on the system specified by the CPU unit.

The present invention relates to a programmable controller system which is provided with a single or a plurality of CPU units for carrying out the control of the entire system and a plurality of I/O units that are operated under a control of the CPU units, and in such a programmable controller system, the CPU unit is provided with an outputting unit that outputs a signal for reset-controlling the control section of the I/O unit as a reset signal to be transmitted to the entire system and an outputting unit that outputs a signal for reset-controlling the output section of the I/O unit so that the resetting operation of the I/O unit is individually carried out between the control section and the output section. Therefore, the resetting control of the I/O units in the entire system is carried out in a divided manner between the resetting of the control section of the I/O unit and the resetting of the output section.

Moreover, the present invention relates to a programmable controller system of a dispersion control type multi-CPU system in which a plurality of CPU units control individually different I/O units, and in this system, one of the plurality of CPU units carries out the resetting control in a unified manner. Therefore, in the programmable controller system of the dispersion control type multi CPU system, the resetting control of the I/O units in the entire system is carried out in a divided manner between the resetting of the control section of the I/O unit and the resetting of the output section.

Furthermore, the present invention provides a programmable controller system of a redundant control type multi-CPU system containing a stand-by CPU unit which, when any one of the duty CPU units that are currently operated is stopped due to an error, is operated in place of the stopped CPU unit. Therefore, in the programmable controller system of the redundant control type multi-CPU system, the resetting control of the I/O units in the entire system is carried out in a divided manner between the resetting of the control section of the I/O unit and the resetting of the output section.

BEST MODE FOR CARRYING OUT THE INVENTION

Embodiment(s) of the programmable controller system according to the present invention will be explained in detail below while referring to the accompanying drawings. First, brief explanations will be given of four types of resetting operations in a programmable controller system in accordance with the present invention.

The CPU unit regularly monitors a port used for confirming the operational state of an I/O unit, and upon detection of any abnormality in the I/O unit, carries out the following sequence of operations depending on the state of the detected error:

(1) when only the output section of the I/O unit managed by its own unit needs to be reset, issues a group I/O reset;

(2) when the control section of the I/O unit managed by its own unit needs to be reset, issues a group unit reset;

(3) when the output sections of the entire system need to be reset due to a serious error, issues a system I/O reset; and (4) when the control sections of the entire system need to be reset, issues a system unit reset.

Figure 1:
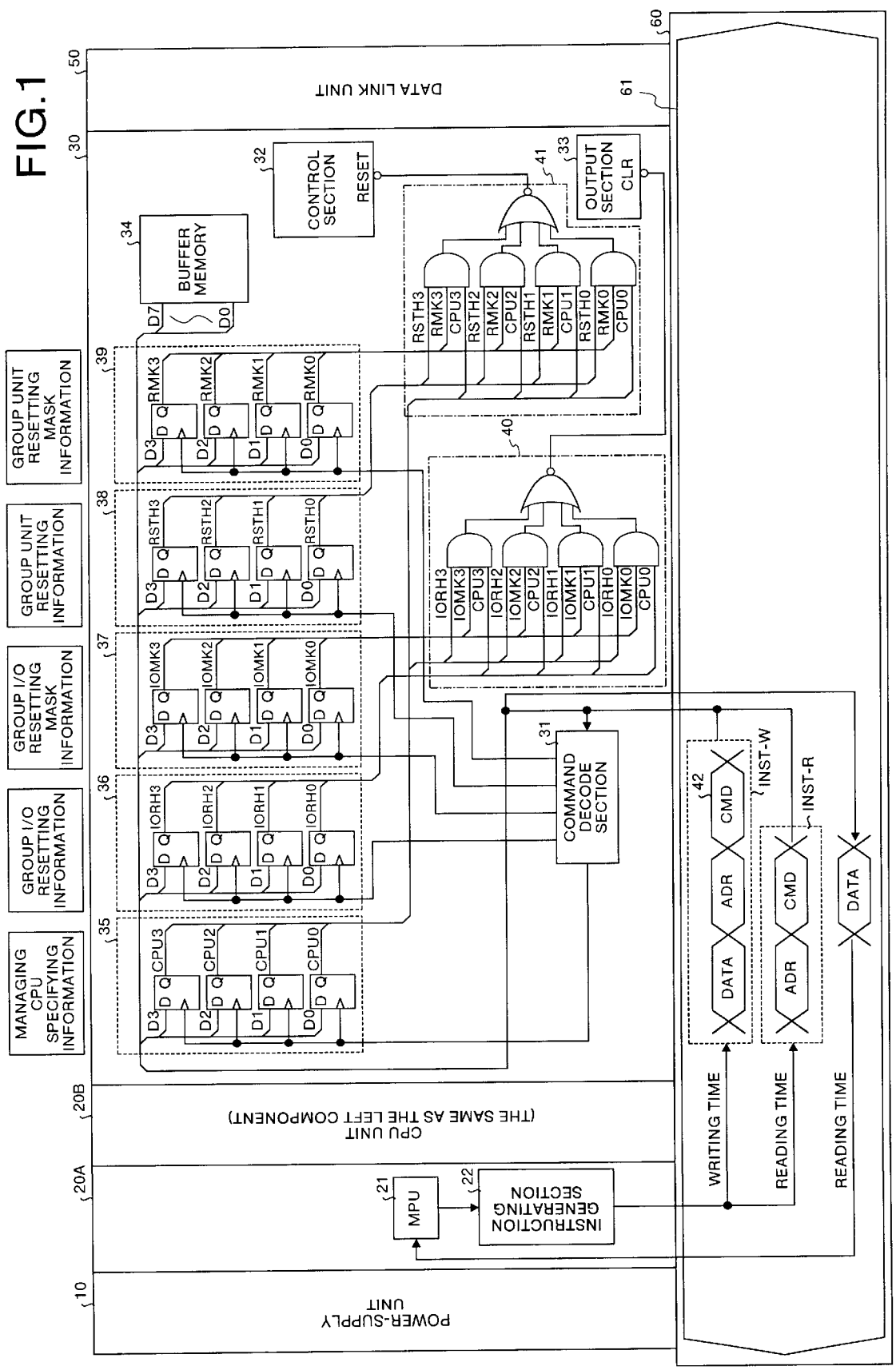
FIG. 1 is a system block diagram that shows a programmable controller system for carrying out a group I/O resetting operation and a group unit resetting operation in the present invention

FIG. 1 shows a programmable controller system containing a plurality of CPU units that are subjected to a group I/O reset and a group unit reset in a first embodiment of the present invention.

This programmable controller system is provided with: a power-supply unit 10 for supplying power to the system; CPU units 20A and 20B serving as central sections of the system for executing operational processes for the control; a positioning unit 30 that is connected to a servo motor (not shown) so as to carry out a positioning control, and a data link unit 50 for executing data communication with another system, not shown, through a dedicated line, and these units are mutually connected through a base unit 60 containing a system bus 61.

Each of CPU units 20A, 20B has a MPU 21 and an instruction generation section 22 for outputting data written by the MPU 21 onto the system bus 61 of the base unit 60, and at the time of writing, issues a write instruction INST-W made by a series of data consisting of three phases, that is, a command phase CMD, an address phase ADR and a data phase DTA (the detailed description thereof will be given later) onto a system bus 61.

A positioning unit 30, which is one I/O unit, includes a command decode section 31 in which the CPU unit 20A or 20B decodes an issued instruction through the system bus 61, a control section 32 for carrying out a positioning control, an output section 33 for outputting a signal for driving a servo motor, a buffer memory 34 for transmitting and receiving data to and from the CPU unit and registers 35, 36, 37, 38 and 39 each of which latches the result of execution of the command decoded by the command decode section 31.

The registers 35, 36, 37, 38 and 39 respectively latch managing CPU specified information, group I/O reset information, group I/O reset mask information, group unit reset information, and group unit reset mask information. The respective outputs of the registers 35, 36 and 37 are connected to the CLR terminal of the output section 33 by the logical circuit 40, and the respective outputs of the registers 35, 38 and 39 are connected to the RESET terminal of the control section 32 by the logical circuit 41 so that the setting of the registers 35 through 39 makes it possible to carry out a reset control on the control section 32 and the output section 33.

For example, when the CPU 0 bit of the register 35, the RSTH 0 bit of the register 38 and the RMK 0 bit of the register 39 are respectively turned on, an L-level signal is inputted to the RESET terminal of the control section 32 from the logical circuit 41 so that the control section 32 is reset to the initial state.

In the programmable controller system, since the CPU unit 20A or 20B issues an instruction INST-W to the I/O unit through the system bus 61 so that a data writing operation is carried out on the I/O unit.

Figure 2:
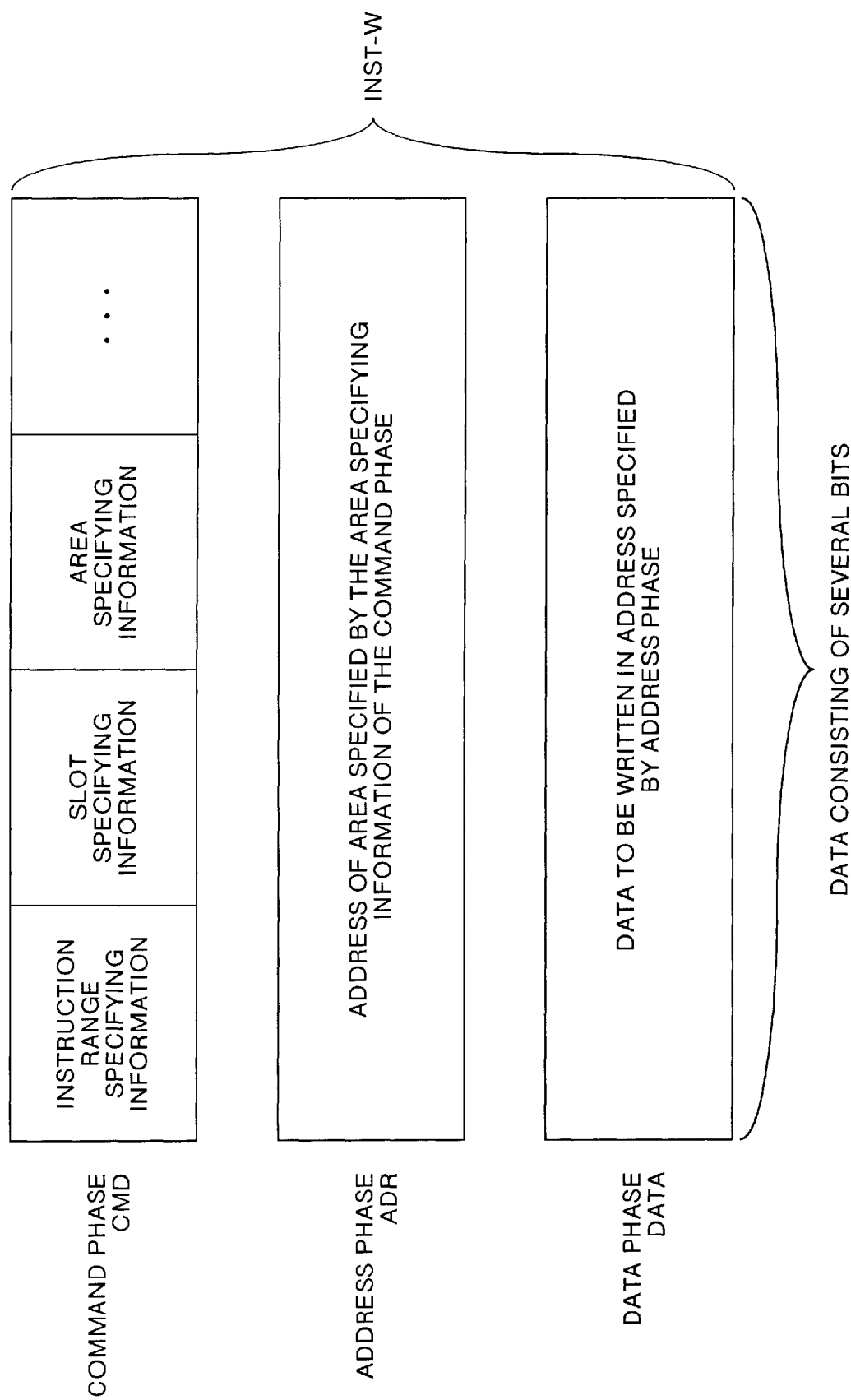
FIG. 2 is an explanatory drawing that shows the contents of an instruction INST-W in detail.

Referring to FIG. 2, a detailed explanation will be given of the contents of the instruction INST-W. The instruction INST-W is made of three phases, that is, a command phase CMD, an address phase ADR and data phase DATA.

The command phase CMD includes a command range specifying information consisting of numerical bits indicating whether the target of the command is all the units of the system or a specific I/O unit, a slot specifying information consisting of numerical bits indicating which I/O unit attached to which slot of the base units the command is directed to when the command is directed to a specific I/O unit, and an area specifying information consisting of numerical bits representing access areas within the I/O unit such as a buffer memory and an input-output register.

To the address phase ADR are written addresses of access areas specified by the command phase CMD of the I/O unit, and the data phase DATA consists of data to be written in the I/O unit at the time of writing, and also consists of data to be read from the I/O unit at the time of reading.

Next, a detailed explanation will be given of a sequence of issuing instructions. When the CPU unit 20A writes data B to an address A of the buffer memory 34 of the I/O unit (positioning unit) 30, the MPU 21, inside the CPU unit 20A, issues to the instruction generation section 22 an instruction INST-W for allowing data B to be written at the address A of the buffer memory 34 with respect to the I/O unit 30.

The instruction generation section 22 outputs a command phase CMD onto a system bus 61, outputs an address phase ADR onto the system bus 61 after a predetermined lapse of time, and also outputs a data phase DATA-W onto the system bus 61 after a lapse of a predetermined time.

When the CPU unit 20A reads the contents of the address C of the buffer memory 34 of the I/O unit 30, the MPU 21 inside the CPU unit 21A issues to the instruction generation section 22 an instruction INST-R for reading the contents of the address C in the buffer memory area with respect to the I/O unit 30.

The instruction generation section 22 outputs a command phase CMD onto the system bus 61, and outputs an address phase ADR onto the system bus 61 after a lapse of a predetermined time. Upon receipt of the command phase CMD and the address phase ADR, the I/O unit 30 outputs data phase DATA, and the CPU unit 20A reads the data phase DATA.

Next, an explanation will be given of an operation of the I/O unit which has received an instruction from the CPU unit.

Each of the I/O units decodes the command phase CMD of the inputted instruction through the system bus 61 by using the command decode section 31, and when any information indicating that the instruction is directed to the unit itself is contained in the command range specifying information of the command phase or the slot specifying information, it writes data specified by the data phase DATA in an address specified by the address phase ADR that is continuously inputted.

Next, an explanation will be given of the case in which the CPU unit 20A issues a group unit reset to the I/O unit. The group unit reset refers to a process in which the control section of a specific I/O unit specified by the CPU unit is reset so that the I/O unit is set to the initial state.

When the CPU unit 20A issues a group unit reset to the I/O unit, it is executed by combining the following two instructions.

One is a writing instruction for writing to the register 35 used for specifying information of the managing CPU inside the I/O unit 30 (or 40) a piece of information indicating that the CPU unit 20A is the corresponding CPU unit for managing the I/O unit 30 (or 40), at the time of the initial setting after turning the power-supply on, with respect to the I/O unit 30 (or 40).

By executing the present instruction, the CPU 0 bit of the register 35 goes high. When the CPU unit 20B has issued the same instruction, the CPU 1 bit of the register 35 goes high.

The other is a writing instruction for writing to the register 38 used for group unit resetting information inside the I/O unit a piece of information indicating that the CPU unit 20A is going to issue a group unit reset to all the I/O units managed by the CPU unit 20A.

By executing the present instruction, the RSTH 0 bit of the register 38 goes high. When the CPU unit 20B has issued the same instruction, the RSTH 1 bit of the register 38 goes high.

The register 39 for latching the group unit reset mask information has an initial value (default value) set to a High level; therefore, when the above-mentioned two instructions are both executed, the input of the RESET terminal of the control section 32 goes low, thereby allowing the I/O unit 30 to reset the control section 32 at the initial state.

Moreover, when the CPU unit 20A outputs an instruction for removing the group unit reset from all the I/O units managed by the CPU unit 20A on the system bus 61, for example, by allowing the command decode section 31 of the I/O unit 30 to decode the command phase CMD, the group unit reset information of the register 38 is cleared so that the RSTH 0 bit goes low with the input of the RESET terminal of the control section 32 going high; thus, the group unit reset is cancelled.

The CPU unit 20A issues an instruction for setting a register 39 for masking the group unit reset instruction from the CPU unit 20A through the system bus 61 to the I/O unit 30 or 40 so that it is possible to mask the group unit reset with respect to each of the I/O units.

With this arrangement, the CPU unit 20A is allowed to uniformly reset all the control sections of the I/O units that it manages, or to only reset a specific one of the control sections that has an error among the I/O units that it manages; thus, it becomes possible to reset control only on the unit with its own control section running away, and consequently to improve the efficiency of the system management.

Next, an explanation will be given of a case in which the CPU unit 20A issues a group I/O reset to the I/O units 30, 40. The group I/O reset refers to a process in which only the output section of the specific I/O unit specified by the CPU unit is reset.

The issuing and canceling of the group I/O reset is executed by combining two instructions, in the same manner as the group unit resetting.

One is a writing instruction for writing to the register 35 used for specifying information of the managing CPU inside the I/O unit 30 (or 40) a piece of information indicating that the CPU unit 20A is the corresponding CPU unit for managing the I/O unit 30 (or 40).

By executing the present instruction, the CPU 0 bit of the register 35 goes high. When the CPU unit 20B has issued the same instruction, the CPU 1 bit of the register 35 goes high.

The other is a writing instruction for writing to the register 36 used for group I/O resetting information inside the I/O unit a piece of information indicating that the CPU unit 20A is going to issue a group unit reset to all the I/O units managed by the CPU unit 20A, at the time of initial setting after turning the power supply on.

By executing the present instruction, the IORH 0 bit of the register 36 goes high. When the CPU unit 20B has issued the same instruction, the IORH 1 bit of the group I/O reset information 47 goes high.

The register 37 for latching the group I/O reset mask information has an initial value (default value) set to a High level; therefore, when the above-mentioned two instructions are both executed, the I/O unit 30 resets the output section 33, thereby turning off the output.

Moreover, when the CPU unit 20A outputs an instruction for removing the group unit reset from all the I/O units managed by the CPU unit 20A on the system bus 61, for example, by allowing the command decode section 31 of the I/O unit 30 to decode the command phase CMD, the group unit reset information of the register 36 is cleared so that the IORH 0 bit goes low with the input of the CLR terminal of the output section 33 going high; thus, the group I/O reset is cancelled.

The CPU unit 20A issues an instruction for setting a register 37 for masking the group unit reset instruction from the CPU unit 20A through the system bus 61 to the I/O unit 30 or 40 so that it is possible to mask the group I/O reset with respect to each of the I/O units.

With this arrangement, the CPU unit 20A is allowed to uniformly clear all the output sections of the I/O units that it manages, or to only reset a specific one of the output sections that has an error among the I/O units that it manages; thus, it becomes possible to improve the efficiency of the system management.

The embodiment shown in FIG. 1 assumes that each of the registers 35 to 39 is a 4-bit register; however, the number of bits of each register may be set to n-bits so that in an attempt to improve the efficiency of the system management, it is possible to carry out the controlling operation by using desired n-number of CPU units.

In the first embodiment, each CPU unit outputs an instruction on a system bus to issue or cancel a group unit reset and a group I/O reset so that with respect to a specific I/O unit specified by the CPU unit, a reset control is carried out while discriminating the control section and output section thereof; therefore, based upon the kind of errors generated, the minimum range of the system can be reset, and controlled, thereby making it possible to improve the efficiency of the system management.

Figure 3:
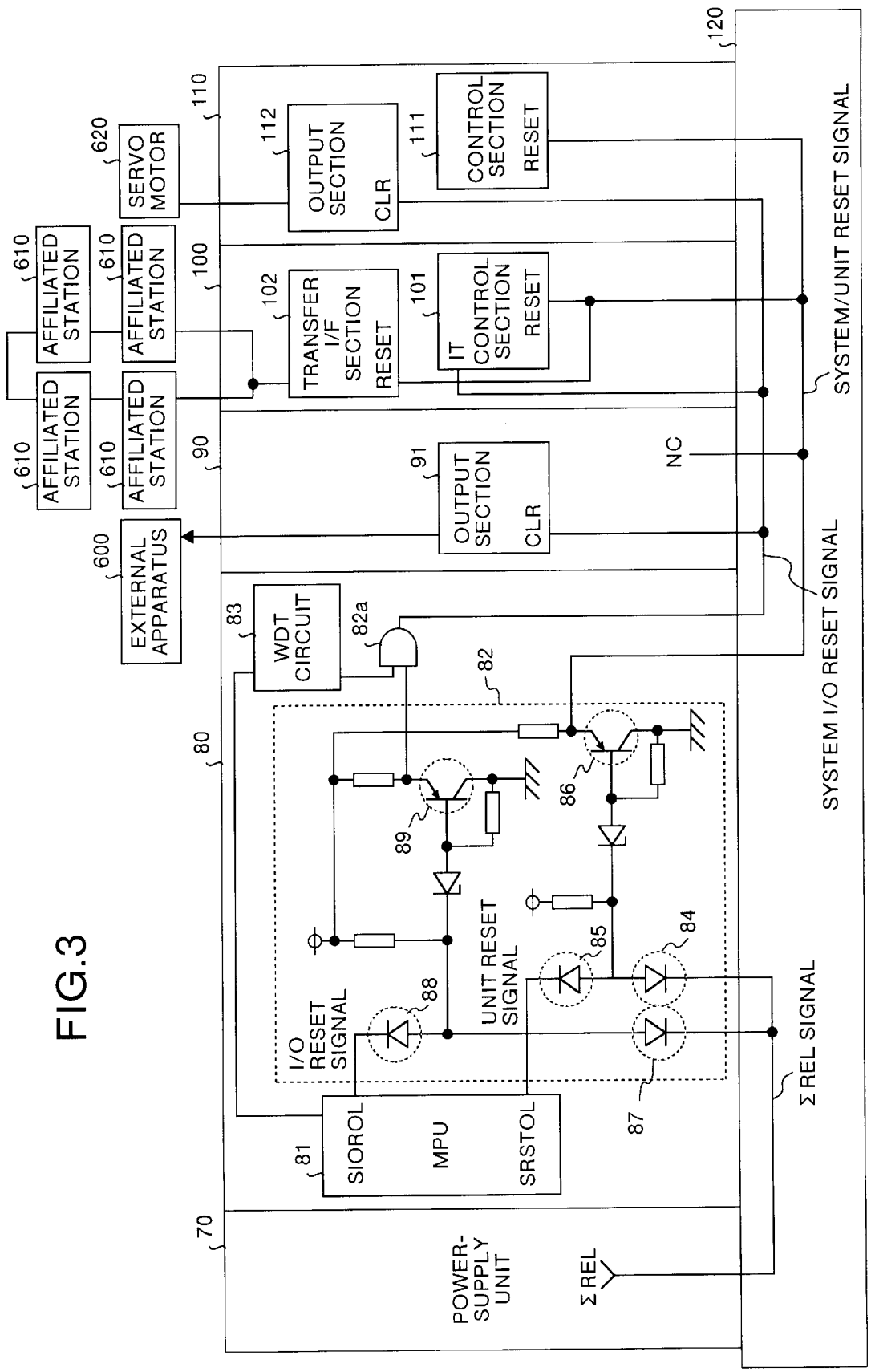
FIG. 3 is a system block diagram that shows a programmable controller system for carrying out a system resetting operation in the present invention.

FIG. 3 shows a programmable controller system for carrying out a system reset in a second embodiment in the present invention. The system reset refers to a resetting operation which is issued by each CPU unit to all the CPU units and I/O units in the system so as to reset the controlling sections or to clear the output sections, thereby turning an external device off.

This programmable controller system is provided with a power supply unit 70 for supplying power to the system, a CPU unit 80 that serves as a central section of the system for executing controlling operation processes, an output unit 90 for outputting ON/OFF information to an external apparatus 600 based upon an instruction outputted by the CPU unit 80, a data link unit 100 for carrying out data communications between systems (affiliated stations 610) through dedicated lines, and a positioning unit 110 connected to the servo motor 620 so as to carry out a positioning control, and these units are attached to a mother board containing a system bus 120 (hereinafter, referred to as a base unit), and bus-connected.

The output unit 90 has an output section 91 for the external apparatus 600, and the positioning unit 110 has a positioning control section 111 and an output section 112 for the servo motor 620. Moreover, the data link unit 100 has a control section 101 and a transfer I/F section 102.

The CPU unit 80 has a reset circuit 82 in addition to the microprocessor (MPU) 81. The reset circuit 82 unifies an error signal (ΣREL signal) for preliminarily announcing a power-supply down, sent from a power-supply system, and a unit reset signal issued by the MPU 81 to all the I/O units in the system, so as to output a reset control signal (hereinafter, referred to as system unit reset signal) for carrying out a reset control for functions other than outputs, such as the control sections of the I/O units and communication I/F section, etc. of all the system.

Moreover, the reset circuit 82 unifies the ΣREL signal, the I/O reset signal that is issued by the MPU 81 to all the I/O units in the system and an output signal from a timer circuit (WDT circuit) 83 for monitoring the operation of the MPU 81 so that it outputs a reset control signal (hereinafter, referred to as a system I/O reset signal) for carrying out a reset control of the output sections of all the I/O units of the system.

In the reset circuit 82, when the ΣREL signal and the unit reset signal are non-active (H level), since no current is allowed to flow through the diodes 84 and 85, the base electric potential of the transistor 86 goes high, allowing a current to flow between the emitter and collector of the transistor 86; thus, the system unit reset signal goes low (non-active).

For example, when the ΣREL signal goes low due to the power-supply-off, since a current flows through the diode 84 in the forward direction, the base electric potential of the transistor 86 goes low, causing no current to flow between the emitter and collector of the transistor 86; thus, the system unit reset signal is allowed to go high (active).

Moreover, for example, in the event of an operation error in the MPU 81, when the CPU unit 80 outputs a unit reset signal in the Low level so as to reset the control section of the I/O unit at the initial state, a current is allowed to flow through the diode 85 in the forward direction so that the base electric potential of the transistor 86 goes low and no current is allowed to flow through the emitter and the collector of the transistor 86; thus, the system unit reset signal is allowed to go high (active).

With respect to the system I/O reset signal also, the reset circuit 82 is provided with the same reset circuit constituted by diodes 87, 88 and a transistor 89. The system I/O reset signal is given by a logical product circuit 82a as a logical product between the output of the reset circuit 82 and the output of the WDT circuit 83 (the initial value of the output of the WDT circuit 83 is the Low level). The WDT circuit 83 monitors the operation of the MPU 81, and when no response is given from the MPU 81 for a predetermined time, it changes the output to go high, by taking it for granted that the MPU 81 has been stopped. Therefore, when the MPU 81 is stopped due to a serious error, a system I/O reset is issued so that the external output is turned off.

Next, an explanation will be given of the operation of the second embodiment. When the MPU 81 makes the unit reset signal active (L level), for example, by operating the reset switch (not shown) provided in the CPU unit 80, so that a system unit reset is issued to all the I/O units in the system, the control sections of all the I/O units constituting the system (the control section 101 of the data link unit 100, the control section 111 of the positioning unit 110) and functions other than the output sections (the communication I/F section 102 of the data link unit 100) are reset to the initial state.

When, in the event of an operation error in the MPU 81 inside the CPU unit 80, a system I/O reset is issued to all the I/O units in the system by allowing the CPU unit 80 to make the I/O reset signal active (L level), only the output sections (the output section 91 of the output unit 90, the output section 112 of the positioning unit 110) of all the I/O units in the system are reset, the output of the external apparatus 600 is turned off, and the driving operation of the servo motor 620 is stopped. Moreover, since an interruption is given to the interrupt terminal IT of the control section 101 of the data link unit 100, the data link unit 100 recognizes that the CPU unit 80 has issued a system I/O reset, and transmits the corresponding information onto the network.

The above-mentioned two system resets are prepared so that, even when the system is stopped due to an error inside the CPU unit 80, it is possible to reset only the output sections 91, 112 of the output unit 90 and the positioning unit 110 without resetting the data link unit 100, and consequently to operate the system with high efficiency.

Figure 4:
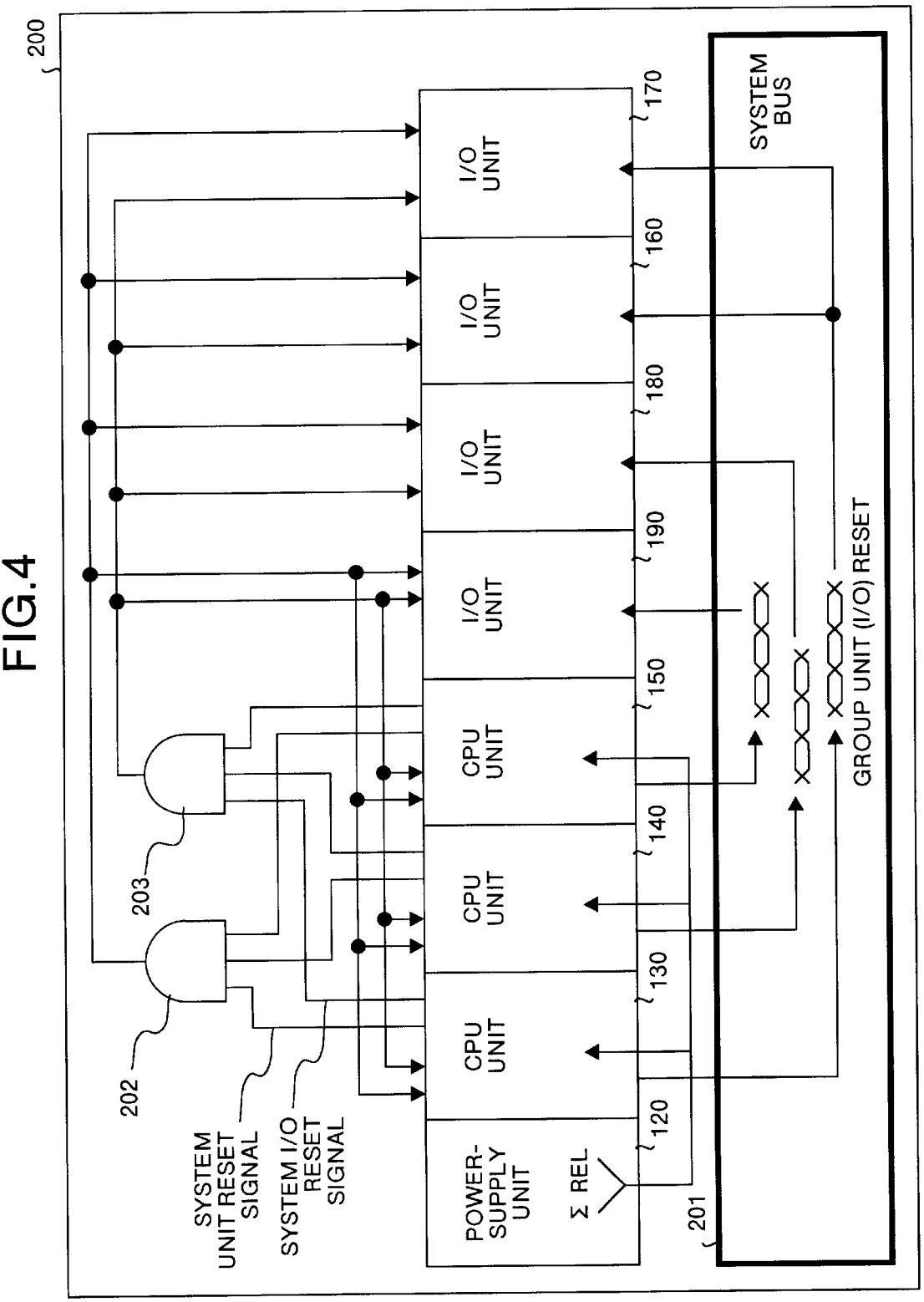
FIG. 4 is a system block diagram indicating a preferred embodiment in which the programmable controller system in the present invention is applied to a programmable controller system of a dispersion control type multi-CPU system.

FIG. 4 shows a preferred embodiment in which the programmable controller system in a third embodiment of the present invention is applied to a programmable controller system of the dispersion control type multi CPU system. The programmable controller system of the dispersion control type multi CPU system refers to a programmable controller system which can achieve a high-speed system control with a large scale by allowing a plurality of CPU units to control respectively different I/O units so as to disperse the load imposed on one CPU unit.

This programmable controller system is provided with a power-supply unit 120, CPU units 130, 140, 150 (originally, any desired number of CPU units can be connected to form the system; however, in this case, for example, the Figure shows a case in which three CPU units are connected), I/O units 160, 170 which are managed by the CPU unit 130, an I/O unit 180 which is managed by the CPU unit 140, and an I/O unit 190 managed by the CPU unit 150, and these units are attached to a base unit 200 including a system bus 201.

Each of the CPU units 130, 140 and 150 has the same instruction generation section as the CPU unit of the first embodiment (FIG. 1), and the same reset circuit as the CPU unit of the second embodiment (FIG. 3); moreover, each of the I/O units 160, 170, 180 and 190 is provided with the same command decode section and the same register, etc., for latching the managing CPU specifying information, etc., as the I/O unit of the first embodiment (FIG. 1), and also designed so as to be inputted by a system reset signal in the same manner as the I/O unit of the second embodiment (FIG. 3).

The base unit 200 includes logical product circuits 202, 203, and system unit reset signals of the respective CPU units 130, 140 and 150 are given to the respective I/O units 160, 170, 180 and 190 in the form of logical products through the logical product circuit 202, and respective system I/O reset signals of the CPU units 130, 140 and 150 are given to the respective I/O units 160, 170, 180 and 190 in the form of logical products through the logical product circuit 203.

Next, an explanation will be given of a system unit reset and a system I/O reset in a programmable controller system of a dispersion control type multi-CPU system. In the programmable controller system of a dispersion control type multi-CPU system, upon application of power, the system unit reset and the system I/O reset are imposed on all the CPU units 130, 140 and 150, and at the time of the initial process, the CPU unit 130 cancels the system unit reset and the system I/O reset so that the system unit reset signal and the system I/O reset signal of the CPU unit 130 are allowed to go low. In contrast, the CPU unit 140 and the CPU unit 150 do not cancel the system unit reset and the system I/O reset, with the result that the system unit reset signal and system I/O reset signal of these CPU units 140, 150 are maintained at the High level.

This arrangement allows the CPU unit 130 to manage the entire system in a centralized manner. In other words, in this state, by making the system unit reset signal outputted by the CPU unit 130 active (H level), the output signal (system unit reset signal) of the logical product circuit 202 is allowed to go high, thereby resetting the functions other than the control sections and the output sections of all the CPU units and I/O units to the initial state.

Moreover, the output signal (system I/O reset signal) of the logical product circuit 203 is allowed to go high by making the system I/O reset signal outputted by the CPU unit 130 active (H level), thereby resetting the output sections of all the CPU units and I/O units in the system.

Next, an explanation will be given of a group reset in the programmable controller system of the dispersion control type multi-CPU system. In the same manner as the first embodiment, when the CPU unit 130 issues a group unit reset, functions other than the control sections and the output sections (the communication I/F section, etc. of the data link unit) of the specific I/O units 160, 170, specified by the CPU unit 130, are reset. In the same manner, when the CPU unit 140 or the CPU unit 150 issues a group unit reset, functions other than the control sections and the output sections of the I/O unit 180 specified by the CPU unit 140 or the I/O unit 190 specified by the CPU unit 150 are reset.

Moreover, when the CPU unit 130 issues a group I/O reset in the same manner as the first embodiment, the output sections of the specific I/O units 160, 170 specified by the CPU unit 130 are reset. In the same manner, when the CPU unit 140 or the CPU unit 150 issues a group I/O reset, the output section of the I/O unit 180 specified by the CPU unit 140 or the I/O unit 190 specified by the CPU unit 150 is reset.

In comparison with the case in which a signal CPU unit controls all the plurality of I/O units, when the control is made by the dispersion control type multi-CPU system as in the case of the present embodiment, the load imposed on one CPU unit is dispersed, thereby making it possible to provide a high-speed system. Moreover, in comparison with a system using a single CPU unit, it is possible to form a larger scale system.

Figure 5:
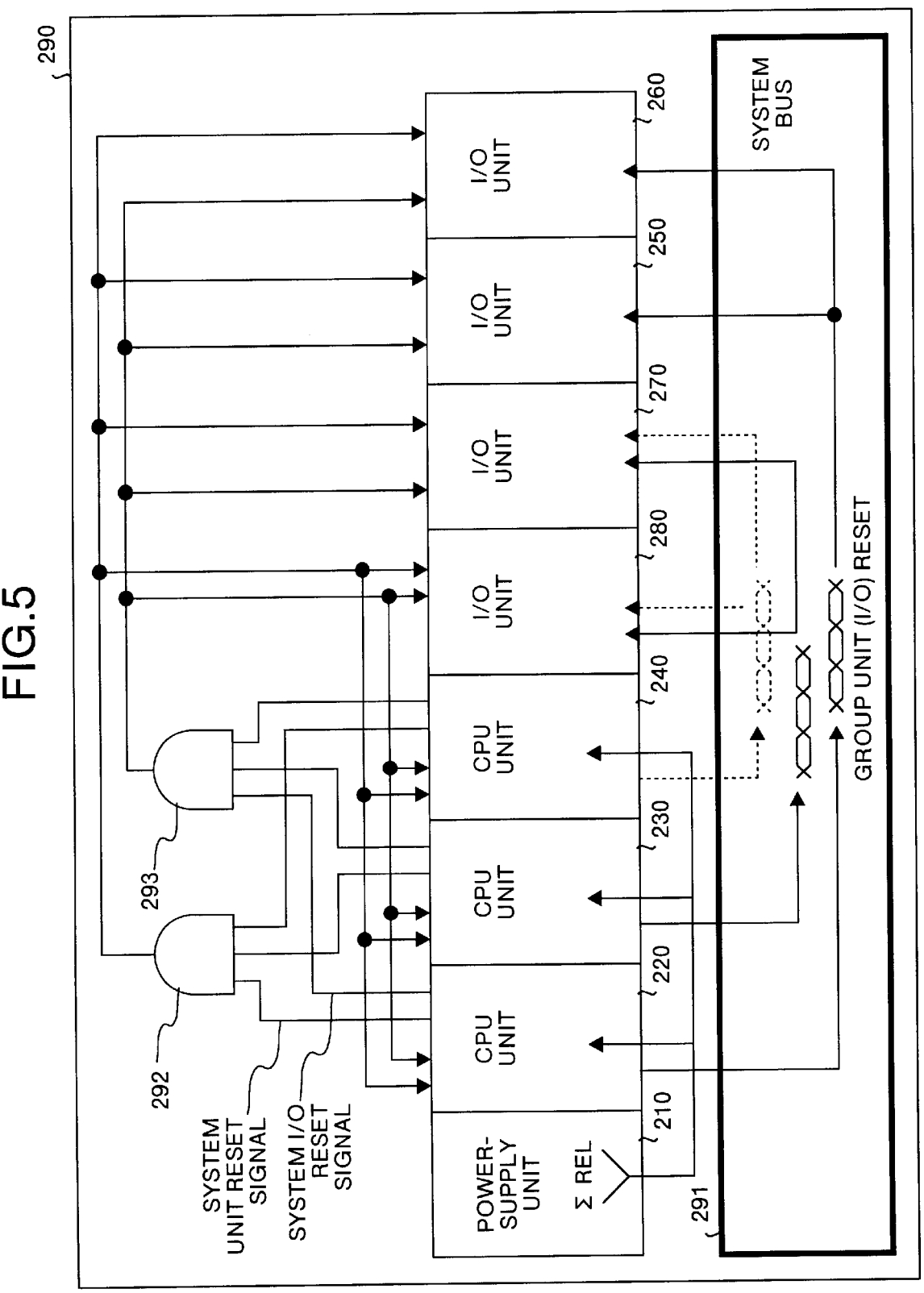
FIG. 5 is a system block diagram indicating a preferred embodiment in which the programmable controller system in the present invention is applied to a programmable controller system of a redundant control type multi CPU system.

FIG. 5 shows a preferred embodiment in which the programmable controller system in a forth embodiment of the present invention is applied to a programmable controller system of the redundant control type multi-CPU system. The programmable controller system of the redundant control type multi-CPU system refers to a programmable controller system with higher security in which a double system is provided by installing a CPU unit (hereinafter, referred to as a stand-by CPU unit) which, when one of a plurality of CPU units that are currently operated is stopped due to a serious error, can be operated in place of the stopped CPU unit.

This programmable controller system is provided with a power-supply unit 210, two duty CPU units 220, 230, a single stand-by CPU unit 240, and a plurality of I/O units 250, 260, 270, 280, and these units are attached to a base unit 290 including a system bus 291.

The duty CPU unit 220 manages the I/O units 250 and 260, the duty CPU unit 230 manages the I/O units 270 and 280, and in the case of the stoppage of the duty CPU unit 230, the stand-by CPU unit 240 is operated in place of this.

When the respective CPU units are provided as the duty CPU unit, the stand-by CPU or the stand-by CPU unit, the user can determine as to which CPU unit each CPU unit can replace and set the result in system information inside each CPU unit through the programming device.

In this preferred embodiment, each of the CPU units 220, 230, 240 is provided with the same instruction generation section as the CPU unit of the first embodiment (FIG. 1) and the same reset circuit as the CPU unit of the second embodiment (FIG. 3); moreover, each of the I/O units 250, 260, 270, 280 is provided with the same command decoder section and register, etc., for latching managing CPU specified information, etc., as the I/O unit of the first embodiment (FIG. 1) and in the same manner as the I/O unit of the second embodiment (FIG. 3), each of them has an arrangement to which the system reset signal is inputted.

The base unit 290 includes logical product circuits 292, 293, and the respective system unit reset signals of the duty CPU units 220, 230 and the stand-by CPU unit 240 are given to each of the I/O units 250, 260, 270, 280 in the form of logical products through the logical product circuit 292; moreover, the respective system I/O reset signals of the duty CPU units 220, 230, and the stand-by CPU unit 240 are given to each of the I/O units 250, 260, 270, 280 in the form of logical products through the logical product circuit 293.

Next, referring to FIG. 6, with respect to the programmable controller system of the redundant control type multi-CPU system, an explanation will be given as to how to detect an error in the CPU unit.

Figure 6:
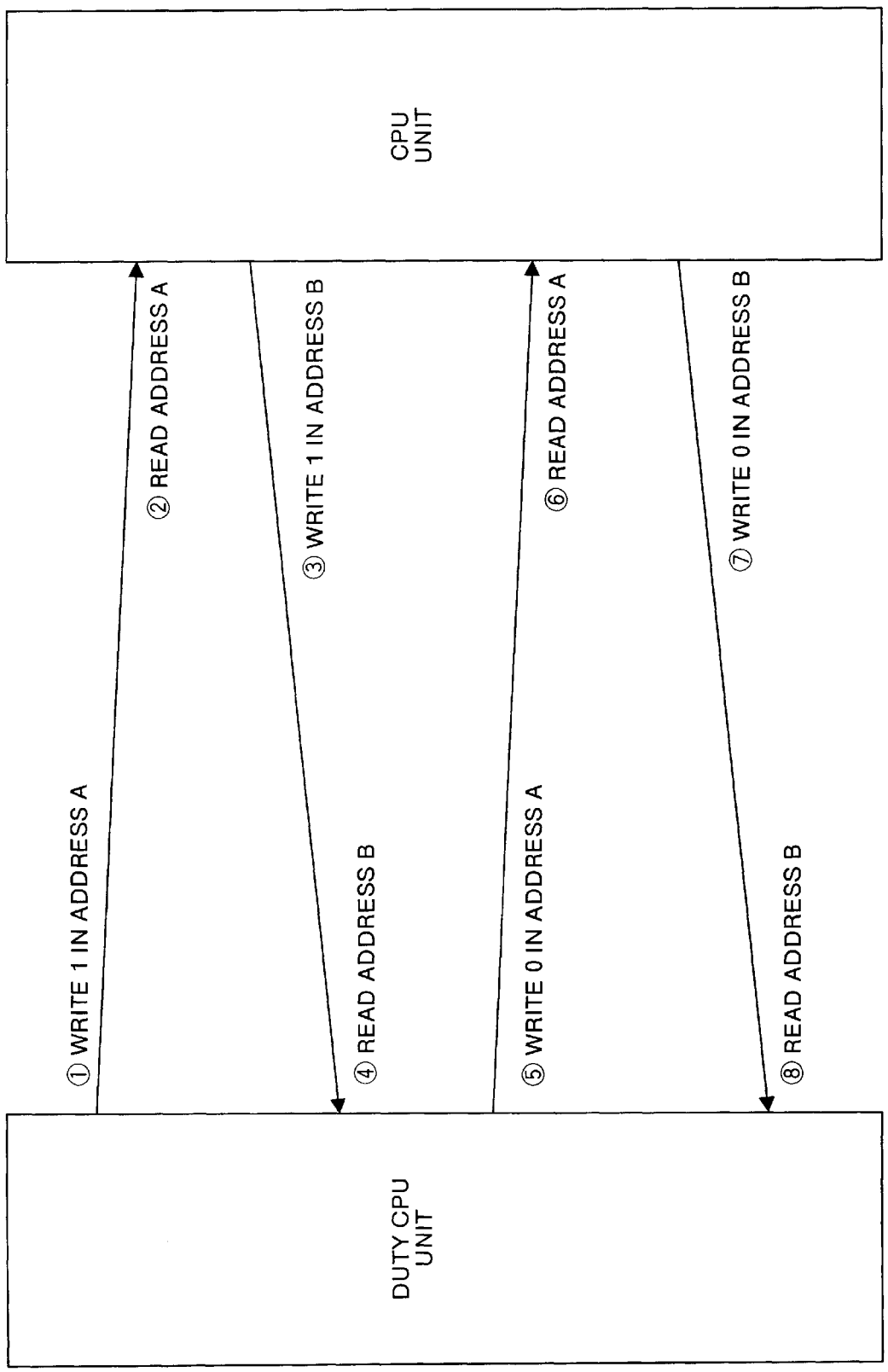
FIG. 6 is an explanatory drawing that shows an error detection sequence of the CPU unit in the programmable controller system of a redundant control type multi CPU system.
Figure 7:
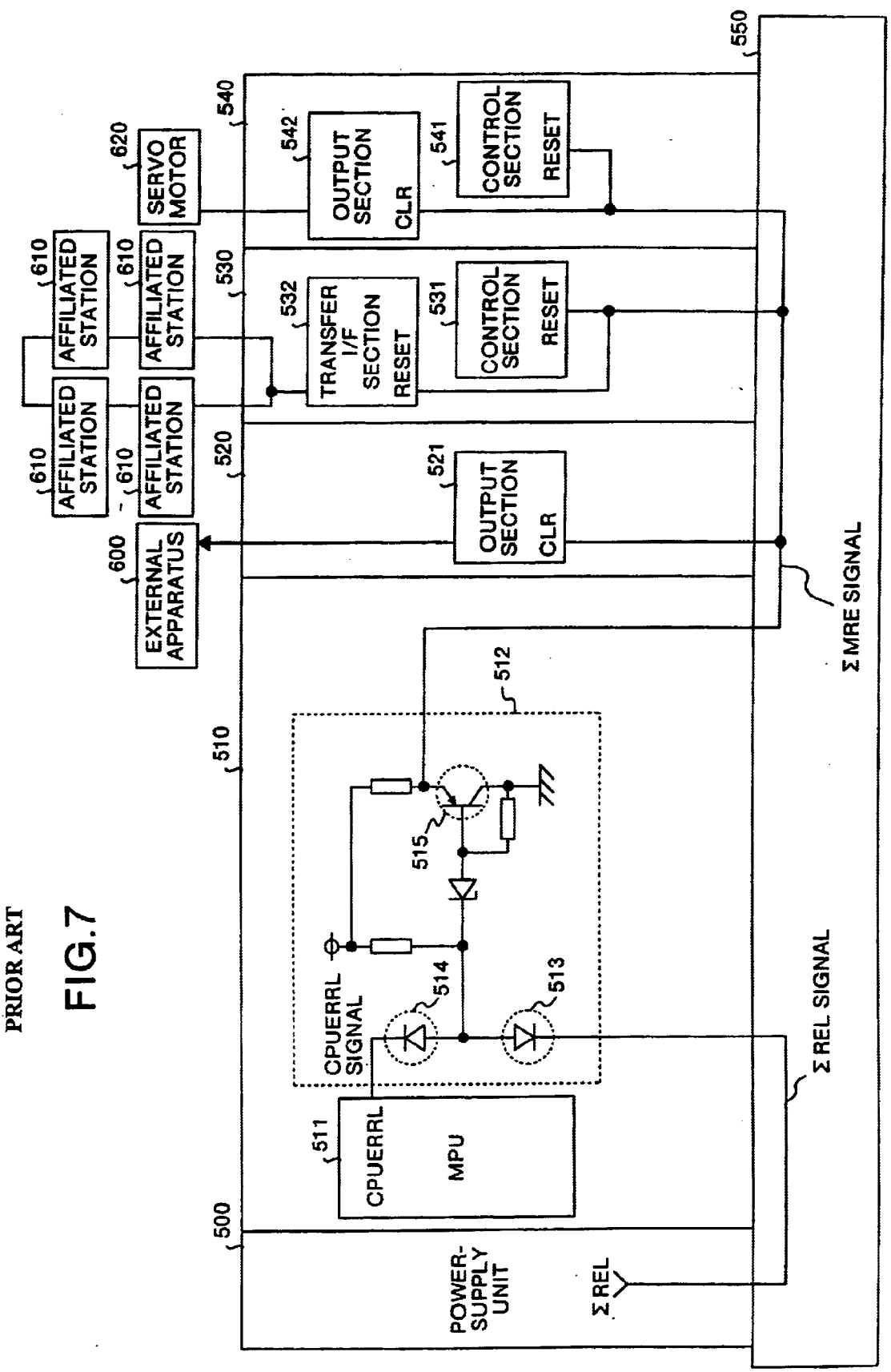
FIG. 7 is a system block diagram that shows a conventional programmable controller system.

First, in order to inform the stand-by CPU unit 240 of the fact that its own unit is normally operated, the duty CPU unit 230 writes "1" in a specific address A of the stand-by CPU unit 240 ((1) of FIG. 6). The stand-by CPU unit 240 reads "1" in address A so that it confirms that the duty CPU unit 230 is normally operated ((2) of FIG. 6).

Thereafter, in order to inform the duty CPU unit 230 of the fact that its own unit is normally operated, the stand-by CPU unit 240 writes "1" in a specific address B of the duty CPU unit 230 ((3) of FIG. 6). The duty CPU unit 230 reads "1" in address B so that it confirms that the stand-by CPU unit 240 is normally operated ((4) of FIG. 6).

Then, in order to inform the stand-by CPU unit 240 of the fact that its own unit is normally operated, the duty CPU unit 230 writes "0", that is, a different value from the previously written value in the specific address A of the stand-by CPU unit 240 ((5) of FIG. 6). The stand-by CPU unit 240 reads the address A and gets "0" which is different from the value previously obtained by reading the address A; therefore, it confirms that the duty CPU unit 230 is normally operated ((6) of FIG. 6).

Thereafter, in order to inform the duty CPU unit 230 of the fact that its own unit is normally operated, the stand-by CPU unit 240 writes "0", that is, a different value from the previously written one, in the specific address B of the duty CPU unit 230 ((7) of FIG. 6). The duty CPU unit 230 reads the address B and gets "0" which is different from the value previously obtained by reading the address B; therefore, it confirms that the stand-by CPU unit 240 is normally operated ((8) of FIG. 6). Thereafter, the sequence (1) to (8) is repeated so as to mutually confirm that the other CPU unit is normally operated (hereinafter, this operation is referred to as "survival confirmation").

When the duty CPU unit 230 is stopped due to a serious error during the operation of the system, the duty CPU unit 230 is unable to write in the address A of the stand-by CPU unit 240. Moreover, the contents of the error are written in the input-output port inside the duty CPU unit 230. In the case of no change in the value of address A, the stand-by CPU unit 240 reads the input-output port inside the duty CPU unit 230 to confirm the error of the duty CPU unit 230, confirms that the duty CPU unit 230 has been stopped, and starts a control of the I/O unit 270 or 280 in place of the duty CPU unit 230.

Moreover, since the MPU inside the duty CPU unit 230 is stopped, the output of the system I/O reset signal of the duty CPU unit 230 is allowed to go high by a WDT circuit. When all the CPU units are stopped, since the system I/O reset signal goes high, the output sections of the entire system are set to reset states; therefore, even when all the CPU units are stopped, the system will not run away.

By achieving the above-mentioned programmable controller system of the redundant type multi-CPU system, it is possible to provide a double-protective system which can normally continue the system control, even when a certain CPU unit has been stopped.

INDUSTRIAL APPLICABILITY

The present invention is applicable to a programmable controller for various machining devices and industrial machines in which the sequential control is carried out.

What is claimed is:

1. A reset controlling method of a programmable controller system, which comprises at least one CPU unit which carries out the control of the entire system and a plurality of I/O units that are operated under a control of the CPU unit, wherein the CPU unit writes a command for instructing a control CPU specified information for each I/O unit, each I/O unit decodes a command instructed by the CPU unit so as to determine whether or not it is information specified by the control CPU, and holds the corresponding information specified by the control CPU in the I/O unit, the CPU unit issues commands for instructing the reset control to all the I/O units, and each I/O unit decodes the command instructing its reset control, and when it has determined that the corresponding command is instructed from the CPU unit of the controlling end, it follows the reset controlling instruction so that the resetting operation of the specific I/O unit on the system specified by the CPU unit is controlled, the CPU unit being provided with two kinds of instructions for reset-controlling the control section of the I/O unit and for reset-controlling the output section of the I/O unit, with respect to instructions for issuing a reset to each of the I/O units.

2. A reset controlling method of a programmable controller system, which comprises at least one CPU unit which carries out the control of the entire system and a plurality of I/O units that are operated under a control of the CPU unit, wherein the CPU unit is provided with two systems of a signal for reset-controlling the control section of the I/O unit and a signal for reset-controlling the output section of the I/O unit as reset signals that are issued to the entire system by the CPU unit, and by utilizing the two signals independently, the resetting of the I/O unit is carried out individually between the control section and the output section.

3. A programmable controller system, which comprises at least one CPU unit which carries out the control of the entire system and a plurality of I/O units that are operated under a control of the CPU unit, wherein the CPU unit writes a command for instructing a control CPU specified information for each I/O unit, each I/O unit decodes a command instructed by the CPU unit so as to determine whether or not it is information specified by the control CPU, and holds the corresponding information specified by the control CPU in the, I/O unit, the CPU unit issues commands for instructing the reset control to all the I/O units, and each I/O unit decodes the command instructing its reset control, and when it has determined that the corresponding command is instructed from the CPU unit of the controlling end, it follows the reset controlling instruction so that the resetting operation of the specific I/O unit on the system specified by the CPU unit is controlled, the CPU unit being provided with two kinds of instructions for reset controlling the control section of the I/O unit and for reset-controlling the output section of the I/O unit, with respect to instructions for issuing a reset to each of the I/O units.

4. The programmable controller system according to claim 3, wherein the I/O unit is provided with a register for latching control CPU specified information and a register for latching information used for resetting only the specific I/O unit on the system specified by the CPU unit.

5. The programmable controller system according to claim 3, wherein the CPU units control respectively different I/O units, that is, form a programmable controller system of a dispersion control type multi-CPU system.

6. The programmable controller system according to claim 3, which is provided as a programmable controller system of a redundant control type multi-CPU system containing a stand-by CPU unit which, when any one of the duty CPU units that are currently operated is stopped due to an error, is operated in place of the stopped CPU unit.

7. A programmable controller system, which comprises a single or a plurality of CPU units for carrying out the control of the entire system and a plurality of I/O units that are operated under a control of the CPU units, wherein the CPU unit is provided with an outputting unit that outputs a signal for reset-controlling the control section of the I/O unit as a reset signal to be transmitted to the entire system and an outputting unit that outputs a signal for reset-controlling the output section of the I/O unit so that the resetting operation of the I/O unit is individually carried out between the control section and the output section.

8. The programmable controller system according to claim 7, wherein said system is provided as a programmable controller system of a dispersion control type multi CPU system in which a plurality of CPU units control individually different I/O units, said system characterized in that one of the plurality of CPU units carries out the resetting control in a unified manner.

9. The programmable controller system according to claim 7, wherein said system is provided as a programmable controller system of a redundant control type multi-CPU system containing a stand-by CPU unit which, when any one of the duty CPU units that are currently operated is stopped due to an error, is operated in place of the stopped CPU unit.

* * * * *